US007630020B2

(12) United States Patent
Fukuda

(10) Patent No.: US 7,630,020 B2
(45) Date of Patent: Dec. 8, 2009

(54) IMAGE PROCESSING APPARATUS AND ITS METHOD

(75) Inventor: Yasuo Fukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 11/275,640

(22) Filed: Jan. 20, 2006

(65) Prior Publication Data

US 2006/0164557 A1 Jul. 27, 2006

(30) Foreign Application Priority Data

Jan. 27, 2005 (JP) .............................. 2005-020018

(51) Int. Cl.
*H04N 9/64* (2006.01)
(52) U.S. Cl. ...................................... 348/650; 348/649
(58) Field of Classification Search .......... 348/607–698
See application file for complete search history.

(56) References Cited

U.S. PATENT DOCUMENTS

| 5,144,427 | A | | 9/1992 | Kitaura et al. ............... 358/136 |
|---|---|---|---|---|
| 5,991,456 | A | | 11/1999 | Rahman et al. ............. 383/254 |
| 6,108,048 | A | * | 8/2000 | Rinaldi ....................... 348/665 |
| 2004/0028271 | A1 | | 2/2004 | Pollard et al. ............... 382/162 |

FOREIGN PATENT DOCUMENTS

| JP | 06-269023 | 9/1994 |
|---|---|---|
| JP | 07-143454 | 6/1995 |
| JP | 2000-49014 | 5/2000 |
| JP | 2002-077723 | 3/2002 |
| KR | 100261236 B | 4/2000 |

OTHER PUBLICATIONS

Daniel J. Jobson et al., "A Multiscale Retinex for Bridging the Gap Between Color Image and the Human Observation of Scenes", *IEEE Transactions on Image Processing*, vol. 6, No. 7, Jul. 1997, pp. 965-976.
Erik Reinhard et al., "Photographic Tone Reproduction for Digital Images", http://www.graphics.cornell.edu/ Jaf/publications/sig02_paper.pdf., *acm Transactions on Graphics*, Jul. 2002, vol. 21, No. 3.

* cited by examiner

*Primary Examiner*—M. Lee
(74) *Attorney, Agent, or Firm*—Fitzpatrick, Cella, Harper & Scinto

(57) ABSTRACT

To obtain a dodging-like effect in moving-image data without expensive extraction of low-frequency components in playback, for a color-correction frame which does not refer to another frame, brightness components are extracted from the entire frame image to generate brightness-component and low-frequency brightness-component images, and these are used to color-correct the frame. For a color-correction frame which refers to another frame, a transition region of the frame image is detected, and used to identify an update image region in which a low-frequency brightness-component image must be updated. Brightness components of the transition region are extracted from the frame image, and are combined with those of a reference frame image, thus generating a brightness-component image. Low-frequency brightness components of the update region are extracted and combined with those of the reference image, thus generating a low-frequency brightness-component image of the frame. The color-correction frame image is color-corrected using the generated brightness-component and low-frequency brightness-component images.

15 Claims, 14 Drawing Sheets

FIG. 5
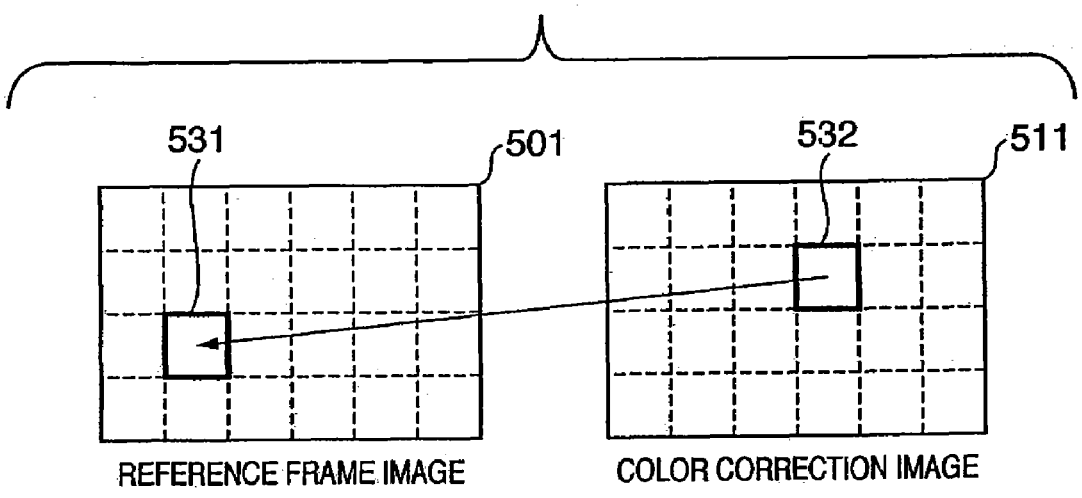
REFERENCE FRAME IMAGE   COLOR CORRECTION IMAGE
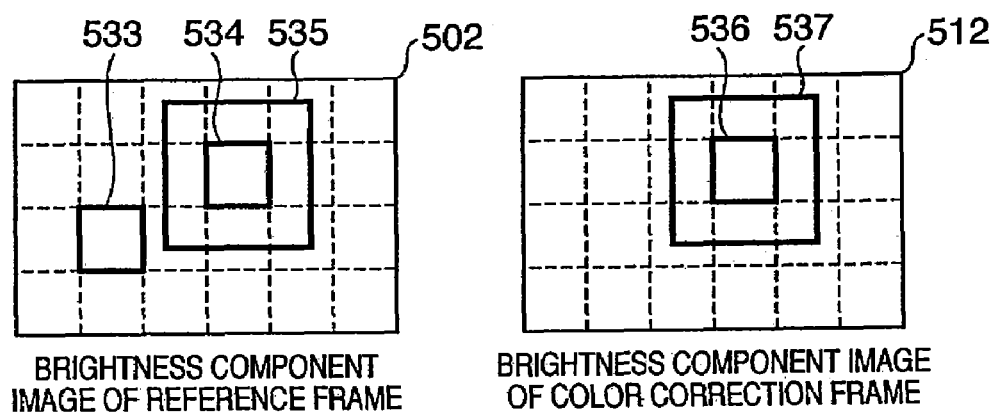
BRIGHTNESS COMPONENT IMAGE OF REFERENCE FRAME   BRIGHTNESS COMPONENT IMAGE OF COLOR CORRECTION FRAME
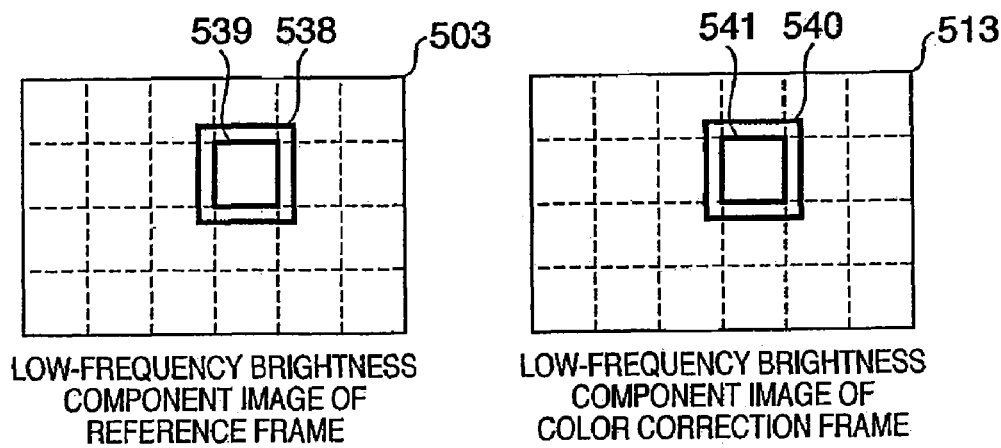
LOW-FREQUENCY BRIGHTNESS COMPONENT IMAGE OF REFERENCE FRAME   LOW-FREQUENCY BRIGHTNESS COMPONENT IMAGE OF COLOR CORRECTION FRAME

FIG. 11
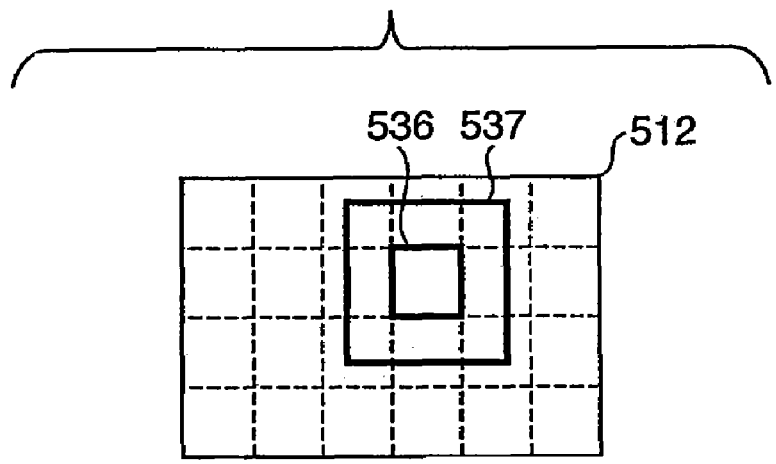
BRIGHTNESS COMPONENT IMAGE
OF COLOR CORRECTION FRAME
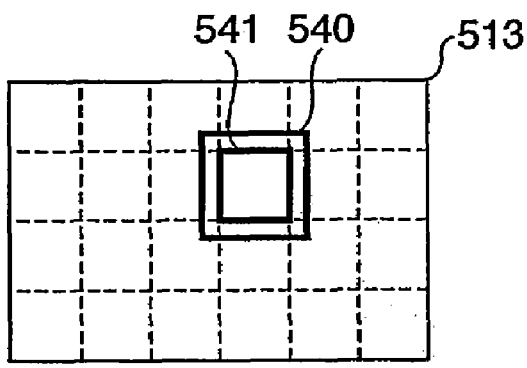
LOW-FREQUENCY BRIGHTNESS COMPONENT
IMAGE OF COLOR CORRECTION FRAME
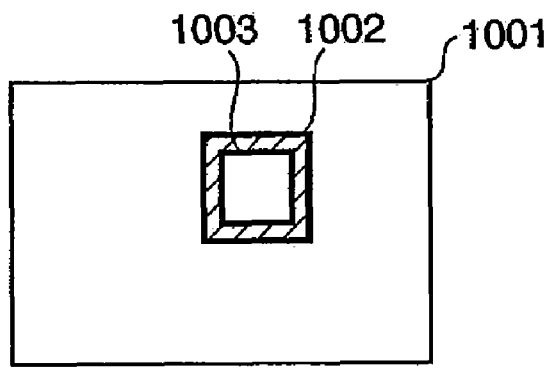
REGION DETERMINATION MAP

IMAGE PROCESSING APPARATUS AND ITS METHOD

FIELD OF THE INVENTION

The present invention relates to an image processing apparatus and its method and, more particularly, to image processing for performing color correction of frame images of moving image data which has inter-frame transition information.

BACKGROUND OF THE INVENTION

As a method of sensing a photograph with appropriate lightness, a method of measuring the average brightness of a scene to be sensed, and controlling the shutter speed, aperture value, and the like of a camera is known. Also, an exposure control method based on so-called evaluation metering for obtaining an appropriate exposure value by segmenting a scene into predetermined regions, and calculating the average brightness value by weighting brightness values measured for respective regions is known.

However, in an image which is sensed in a so-called backlight scene in which an object is especially dark compared to the background, the object inevitably becomes dark. In order to sense a photograph with appropriate lightness in such backlight scene, the exposure value of the camera must be set to sense a relatively lighter image (exposure correction). However, exposure correction requires not only troublesome operations but also skills. Even when an appropriate exposure value can be set for the object, the background often becomes too light.

As an analog photograph technique for obtaining an image with appropriate lightness in a backlight scene in which it is difficult to appropriately decide the lightness of an image, so-called dodging which is done in a dark room is known. By applying dodging, a photograph with appropriate lightness can be obtained.

As a method of implementing dodging in digital image processing, for example, a report: Jobson et al., "A Multiscale Retinex For Bridging the Gap Between Color Images and the Human observation of Scenes", IEEE TRANSACTIONS IMAGE PROCESSING, VOL. 6, NO. 7, July 1997, is known (reference 1). In this method, differential processing between a component obtained by log-converting a digital image and a low-frequency component of the log-converted component is executed. Then, the image is changed for the better by processing a light component in the low-frequency range of the digital image to be darker, and a dark component in the low-frequency range to be lighter.

Also, a report; Reinhard et al., "Photographic Tone Reproduction for Digital Images", acm Transactions on Graphics, July 2002, Vol. 21, No. 3, is known. This report also proposes a method of obtaining a dodging-like effect in digital image processing using the brightness component of a digital image and its low-frequency component.

Of course, exposure correction is not limited to still images, and is similarly required in moving image sensing. Since a moving image can be considered as a set of a series of still images which are continuous along the time axis, the aforementioned image correction can be easily applied to the moving image.

However, playback processing of digital moving image data has high processing cost and requires high processing performance for a playback apparatus. In addition, in order to implement image processing that can obtain a dodging-like effect, extraction processing of the low-frequency component or the like must be added to the playback processing of a moving image, thus requiring higher processing cost and higher processing performance. Of course, these requirements lead to a high price of the apparatus.

As a known technique associated with such image processing, an apparatus described in Japanese Patent Laid-Open No. 2000-149014 is known.

In recent years, it is possible to play back digital moving image data using application software which runs on a personal computer (PC). However, a Central Processing Unit (CPU) or Graphical Processing Unit (GPU) are required to have high processing performance. If the processing performance is insufficient, the processing cannot be done in time, and some frames are not played back upon playback of a moving image, thus causing so-called drop frame.

In terms of a reduction of the processing load of digital moving image data, a technique described in Japanese Patent Laid-Open No. 2002-77723 is known. This technique detects a scene change based on difference images upon coding, decides a correction method using a predicted image upon the scene change, and applies the decided correction method until the next scene change. However, this technique cannot be applied to image processing that obtains a dodging-like effect.

SUMMARY OF THE INVENTION

The first aspect of the present invention discloses a method of performing color correction on a frame image of moving image data, comprising the steps of:

detecting a transition region in a target frame image of the color correction;

setting an update region in the target frame image, where low frequency data is to be updated, in accordance with the detected transition region;

generating the low frequency data of the update region from image data of the target frame image; and generating low frequency data of the target frame image in accordance with low frequency data of a reference frame image and the low frequency data of the update region, and performing the color correction on the target frame image.

According to the present invention, the processing load upon making color correction of frame images of moving image data can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view for explaining update processing of a brightness component image and low-frequency brightness component image when frame images have a reference relationship;

FIG. 11 shows an example of a region determination map;

DESCRIPTION OF THE PREFERRED EMBODIMENTS

Image processing according to preferred embodiments of the present invention will be described in detail hereinafter with reference to the accompanying drawings.

First Embodiment

[Arrangement of Apparatus]

Figure 1:
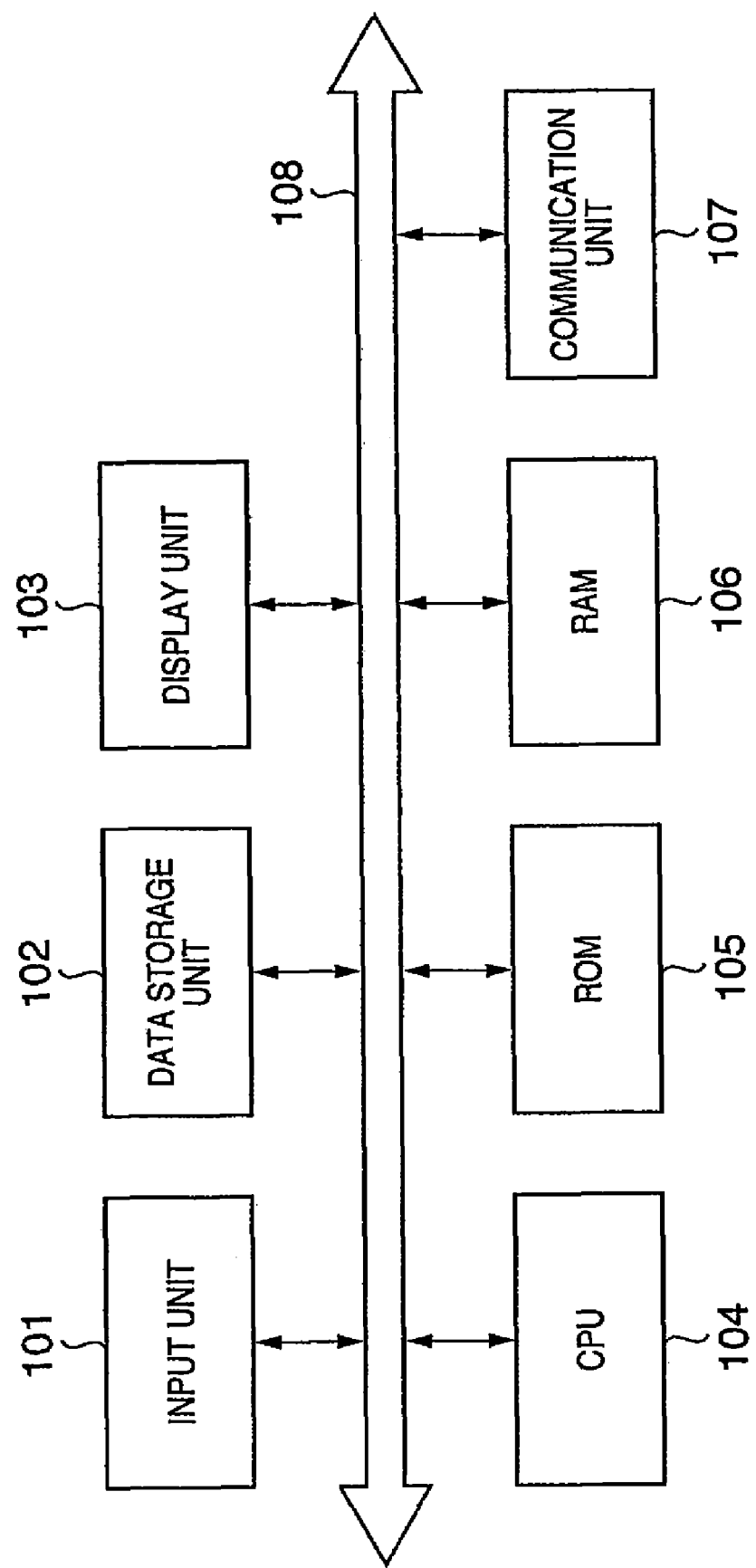
FIG. 1 is a block diagram showing the arrangement of an image processing apparatus.

FIG. 1 is a block diagram showing the arrangement of an image processing apparatus.

A CPU 104 controls respective components to be described later via a system bus 108 by executing programs stored in a ROM 105 using a RAM 106 as a work memory, thus implementing image processing and the like to be described later. The programs and data required for the image processing and the like to be described later are stored in a data storage unit 102 or the ROM 105. These programs and data are temporarily loaded onto the RAM 106, and are then executed.

An input unit 101 inputs instructions and data from the user who operates a keyboard and pointing device. The pointing device includes a mouse, track ball, track pad, tablet, and the like. When this embodiment is applied to a digital camera, buttons, a mode dial, and the like equipped on an operation unit of the digital camera correspond to the input unit 101. Of course, a keyboard (so-called software keyboard) may be displayed on a display unit 103 (to be described later) to input characters by operating the buttons or mode dial or the aforementioned pointing device.

The data storage unit 102 is a memory for holding moving image data and the like, and normally preferably comprises removable storage media such as a hard disk, CD-ROM, CD-R, DVD, memory card, USB memory, and the like. The data storage unit 102 can store programs and other data in addition to the image data.

A communication unit 107 is an interface which makes communications between apparatuses. For example, the communication unit 107 comprises a wired or wireless network interface, a serial bus interface such as Universal Serial Bus (USB), IEEE1394, or the like, an infrared ray communication (IrDA) interface, and the like. Of course, a communication via a telephone line or the like may be used, and the communication unit 107 comprises a MODEM in such case.

The display unit 103 displays moving images before and after image processing, images of a user interface, and the like, and normally uses a CRT, liquid crystal display, or the like. Of course, the display unit 103 may comprise a video interface, and may display the moving image and user interface on an external display via a cable.

Note that FIG. 1 illustrates the arrangement example of a single apparatus which includes all the input unit 101, data storage unit 102, and display unit 103. Alternatively, these units may be connected via a communication path based on a known communication method, and may form the arrangement shown in FIG. 1 as a whole.

The image processing apparatus of the first embodiment suitably operates when moving image data according to a predetermined format having inter-frame transition information is stored in the data storage unit 102. However, moving image data may be externally received via the communication unit 107, and the received moving image data may be stored in the data storage unit 102 or RAM 106, thus implementing image processing to be described later. In this case, processing may be done after full moving image data is received, or the already received moving image data may be processed parallel to reception of the moving image data. Furthermore, if a storage capacity large enough to store an intermediate image (brightness component image) or the like can be assured on the RAM 106, the data storage unit 102 may be omitted.

Alternatively, when the CPU 104 executes a program of inter-frame transition information detection processing to generate inter-frame transition information, moving image data received from an image input apparatus having a CCD and the like can undergo image processing. The inter-frame transition information detection processing can use, e.g., known motion vector generation processing.

[Color Correction Processing]

Color correction processing which is executed by the CPU 104 and is to be applied to a still image or frames of a moving image will be described first, and that of a moving image will be described later.

Figure 2:
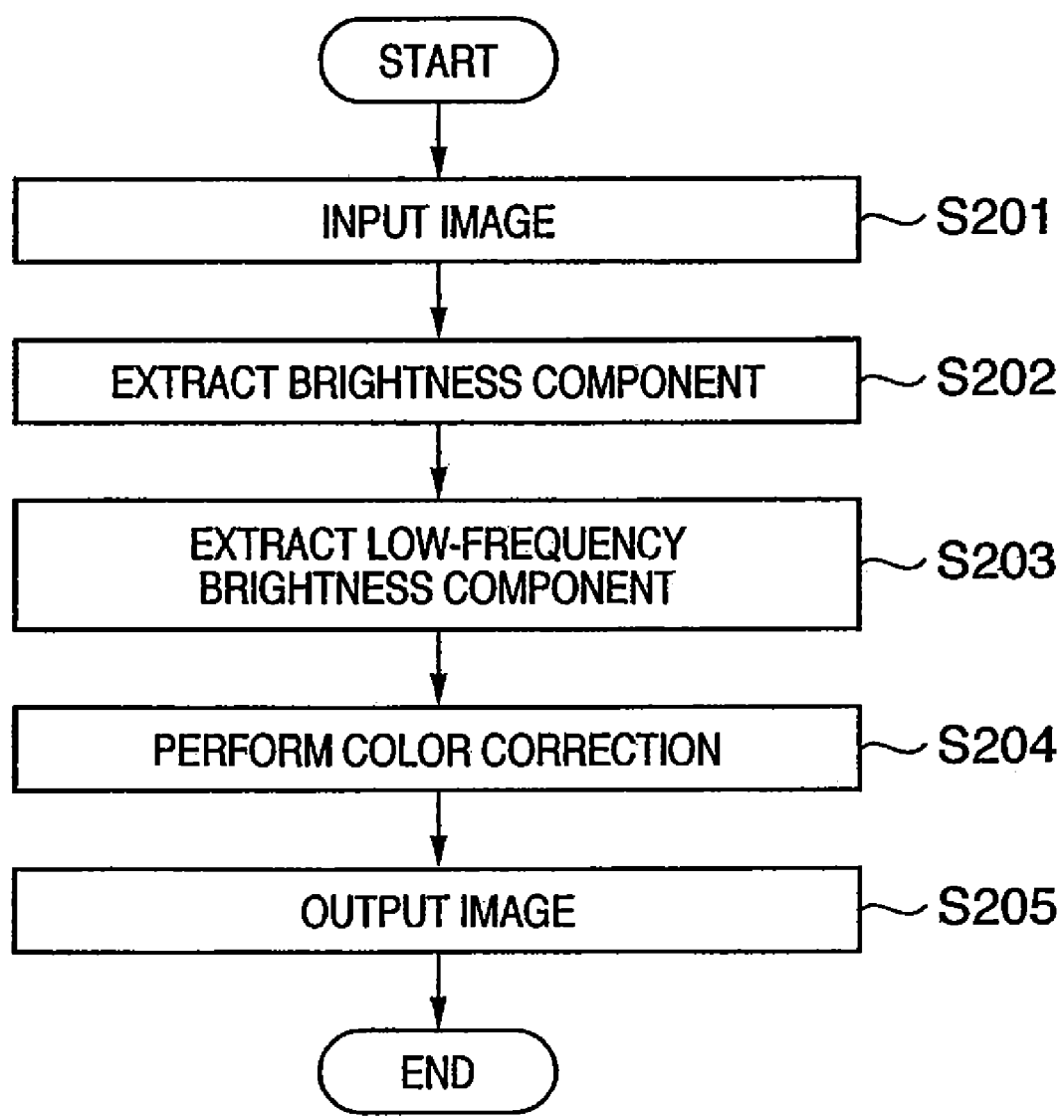
FIG. 2 is a flowchart for explaining color correction processing.

FIG. 2 is a flowchart for explaining the color correction processing, and an overview of this color correction processing will be described below. For example, an image is input from the data storage unit 102 (S201), and the brightness distribution of the input image is examined to generate a brightness image (S202). Two-dimensional filter processing is applied to the brightness image to extract a low-frequency component to generate a brightness image of the low-frequency component (to be referred to as a low-frequency brightness image hereinafter) (S203). The brightness image and low-frequency brightness image are generated in correspondence with a plurality of resolutions, and an original image is color-corrected with reference to the brightness images and low-frequency brightness images at the plurality of resolutions (S204), thus outputting the color-corrected image (S205).

For example, when the input image is expressed by an sRGB color space described in IEC61966-2-1, the extraction processing (S202) of the brightness components of the input image follows a method described in IEC61966-2-1. That is, the input image is converted into an image on a CIE1931 XYZ color space by gamma conversion and 3×3 matrix operation. Let X(x, y), Y(x, y), and Z(x, y) be data upon converting pixel values R(x, y), G(x, y), and B(x, y) at a position (x, y). Then, Y(x, y) is a brightness component to be extracted, and X(x, y) and Z(x, y) are color components. In case of hardware implementation of this brightness extraction, for example, such extraction circuit comprises a table lookup circuit (gamma conversion unit) that uses a lookup table and a matrix operation circuit.

As an extraction method of the brightness components, the aforementioned processing may be simplified, and the brightness component may be extracted by only matrix operations by omitting gamma conversion. Also, using the following color spaces in place of the CIE1931 XYZ color space, corresponding color space conversion may be used.

| Color space | Brightness component | Color component |
|---|---|---|
| YCbCr | Y value | Cb and Cr values |
| L*a*b* | L* value | a* and b* values |
| HSV | V value | H and S values |
| HSL | L value | H and S values |

The color space conversion may use one which is specified by pertinent standards and the like, but it may use an approximate calculation. For example, the specified conversion from RGB values into a Y value on the YCbCr color space is expressed using a conversion formula given by:

$$Y = 0.299R + 0.587G + 0.114B \quad (1)$$

In place of this formula, the conversion may use an approximation formula given by:

$$Y = (3R + 6G + B)/10 \quad (2)$$

Furthermore, the G value of RGB signal values may be used as an approximate value of a brightness component, or an average value or maximum value of RGB components may be used as a brightness value.

In the description of the first embodiment, assume that an input image is expressed by the sRGB color space. However, even when an image is expressed by RGB color spaces (e.g., an Adobe RGB color space, RIMM/ROMM RGB color space, and the like) other than sRGB, it can be converted into an image on the CIE1931 XYZ (or other color spaces described above) in accordance with the definitions of respective color spaces.

The color space may be converted according to the definition or conversion formula of each color space or using an ICC profile or the like. Such method is particularly effective when an input image is expressed by device-dependent RGB values (device RGB values) and cannot be converted using a simple conversion formula.

Also, when an input image is expressed by, e.g., sYCC in place of RGB, it can be converted using a conversion formula from sYCC into CIE1931 XYZ (or other color spaces described above) or using an ICC profile or the like. However, when an original image is expressed by sYCC and Y of YCbCr is used as a brightness component, i.e., when the original color space matches that of the brightness component, the Y value of the original image need only be simply extracted, and the need for the color space conversion processing can be obviated.

Next, the low-frequency brightness component extraction processing (S203) is implemented using known low-pass filter processing.

According to the method based on reference 1 described above as an example of the color correction processing (S204), the distributions of the brightness components and scale-converted brightness components are log-converted, and their difference is output. Furthermore, the weighted average of difference outputs at different scales (different resolutions) is defined as an improved brightness component. This method cannot adjust the degree of improvement depending on images. In this embodiment, the log-conversion output of the scale-converted brightness component is multiplied by a coefficient. This coefficient is a parameter that adjusts the degree of improvement.

The improved brightness component based on the aforementioned processing is given by:

$$Y'(x,y) = \Sigma_n Wn\{\gamma_0 \cdot \log Y(x,y) - \gamma_1 \cdot \log [Fn(x,y) * Y(x,y)]\} \quad (3)$$

where Y'(x, y) is the improved brightness component having a coordinate value (x, y),
Fn(x, y) is the Gaussian function at the coordinate value (x, y),
Wn is the weight between scales,
n is a parameter indicating a scale,
$\gamma_0$ is parameter 0 indicating the degree of improvement,
$\gamma_1$ is parameter 1 indicating the degree of improvement, and
* is the product-sum operation.

Note that the weight Wn between scales can be omitted (replaced by a simple average) by adjusting the standard deviation of scales. Also, it is preferable in terms of image quality of image data to re-convert into an original brightness unit by inverse conversion (exponent operation) rather than outputting the log-converted value unlike in formula (3). Therefore, it is more preferable to define as the improved brightness component the output given by:

$$Y'(x,y) = \exp\{\gamma_0 \cdot \log Y(x,y) - \gamma_1 \cdot \text{Ave}[\log(Fn(x,y) * Y(x,y))]\} \quad (4)$$

where Ave is the average value operation.
In place of formula (4), formula (5) may be used:

$$Y'(x,y) = Y(x,y)^{\gamma_0} / \{\text{Ave}[Fn(x,y) * Y(x,y)]\}^{\gamma_1} \quad (5)$$

Note that the average value operation of scale-converted outputs at a plurality of scales may be done in the extraction processing (S203) of the low-frequency brightness component, and the average value of the scale-converted outputs at the plurality of scales may be defined as the distribution of the scale-converted brightness components.

Alternatively, as a formula that obtains an effect similar to formula (4) or (5), formula (6) may be used.

$$Y'(x,y) = \text{Ave}[Y(x,y)^{\gamma_0} / \{Fn(x,y) * Y(x,y)\}^{\gamma_1}] \quad (6)$$

In case of hardware implementation of the conversion into the improved brightness component, for example, such conversion circuit comprises, e.g., an average value operation circuit, a circuit for generating a lookup table, a table storage circuit, a table lookup circuit (gamma conversion unit), and a division circuit. Note that the average value operation circuit may be arranged in a part which implements extraction of the low-frequency brightness components.

Furthermore, in the color correction processing (S204), color components are corrected according to the conversion into the improved brightness components so that the colors of image data after the processing remain unchanged as much as possible. Preferably, for example, color components X(x, y) and Z(x, y) are respectively multiplied by a ratio Y'(x, y)/Y(x, y) of the brightness components before and after conversion (to be referred to as a correction ratio hereinafter). However, it is easy to simplify the processing. For example, only Y(x, y) is converted into Y'(x, y) by formula (5) or (6), and no conversion is applied to the color components X(x, y) and Z(x, y).

The color space of the converted XYZ data is converted to obtain sRGB data. This processing is inverse conversion of the color space conversion in step S202. Therefore, a 3×3 matrix operation and inverse gamma conversion are made to output an image, sRGB components of which respectively have 8 bits (S205). In case of hardware implementation of this reconstruction of image data, for example, such reconstruction circuit comprises multiplication and division circuits, a matrix operation circuit, and a table lookup circuit using a lookup table (inverse gamma conversion unit).

Alternatively, the correction ratio Y'(x, y)/Y(x, y) may be calculated by the above method, and the sRGB components of the input image may be respectively multiplied by this ratio.

Figure 3:
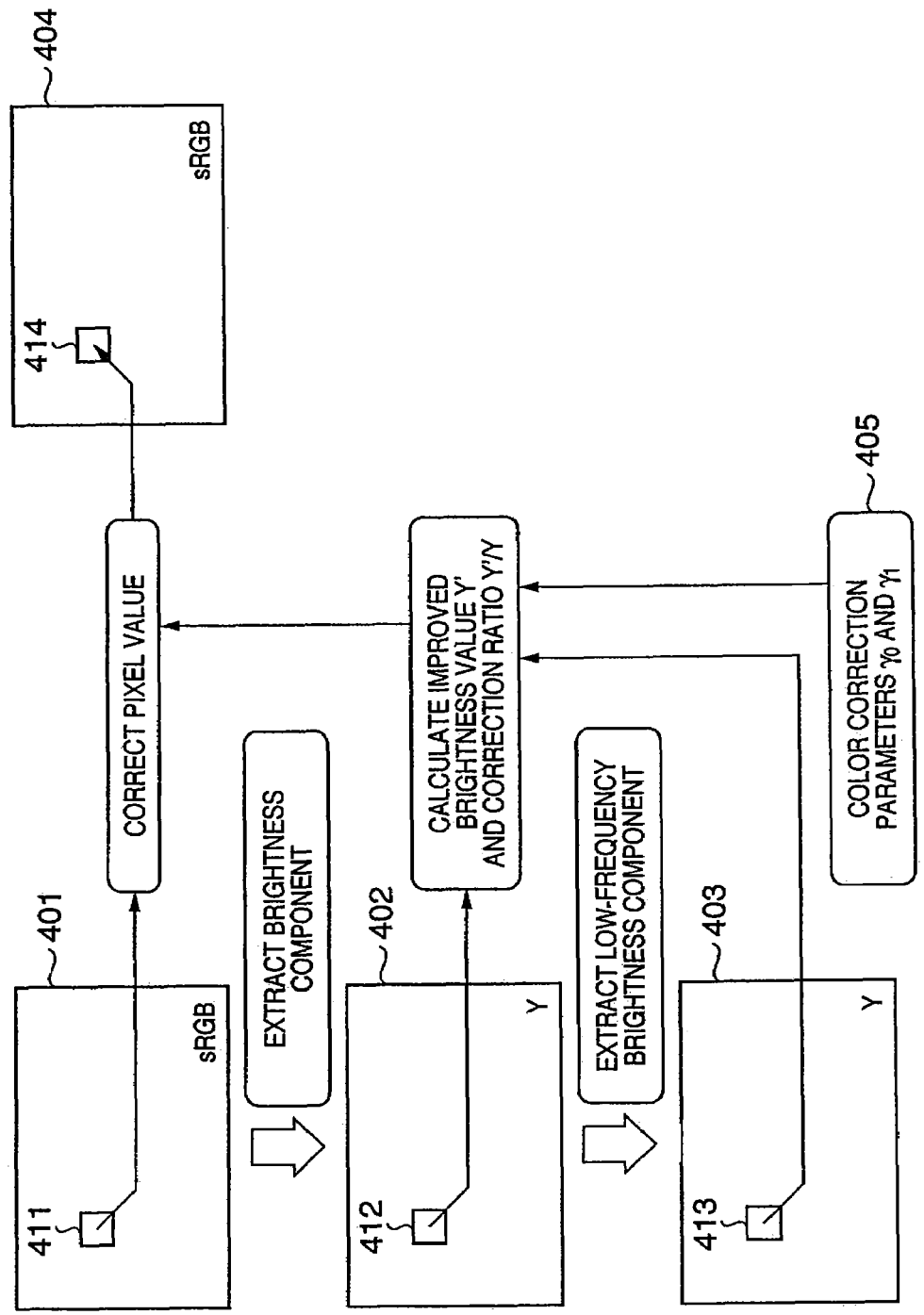
FIG. 3 is a view conceptually showing the relationship between the color correction processing and respective data.

FIG. 3 conceptually shows the relationship between the color correction processing and respective data.

A brightness component image 402 is extracted from an sRGB input image 401, and is then converted into a low-frequency brightness component image 403 by low-pass filter processing. Then, an improved brightness value Y' is calculated from the Y value of a pixel of the low-frequency brightness component image 403 corresponding to a pixel 411 of the input image 401, and color correction parameters 405 (corresponding to $\gamma_0$, $\gamma_1$, and the like). Furthermore, a correction ratio Y'/Y as a ratio to a brightness value Y of a pixel 412 of the brightness component image 402, which corresponds to the pixel 411 of the input image 401, is calculated. Then, sRGB values of the pixel 411 are respectively multiplied by the correction ratio Y'/Y and so forth to calculate the pixel value of a pixel 414 of an sRGB output image 404. Note that the pixel 412 corresponds to Y(x, y) in formulas (4) to (6), and the pixel 413 corresponds to Fn(x, y)*Y(x, y) in formulas (4) to (6).

The color correction parameters 405 may be set in advance in accordance with the image processing system, and they may be applied. Alternatively, a plurality of color correction parameter sets may be prepared, and the user may selectively set these parameters. In this case, these parameter sets may be displayed on the display unit 103 in a form that allows the user to easily recognize color correction parameter differences such as "strong", "middle", "weak", and the like. Of course, a GUI such as a list box, text box, sliders, buttons, or the like may be displayed on the display unit 103, and the user may select or input the value by operating the input unit 101.

FIG. 3 illustrates that the input image 401, brightness component image 402, and low-frequency brightness component image 403 have the same size. However, the sizes of these images need not be matched. That is, sampling may be made in extraction of the brightness components and/or that of the low-frequency brightness components. In this case, the brightness component image 402 and low-frequency brightness component image 403 may be converted to have the same sizes as that of the input image 401 by known variable magnification processing before execution of the above processing. The brightness component image 402 may be intermediate image data required to generate the low-frequency brightness component image 403, and brightness components may be extracted anew from the input image 401 upon color correction.

[Moving Image]

Figure 4:
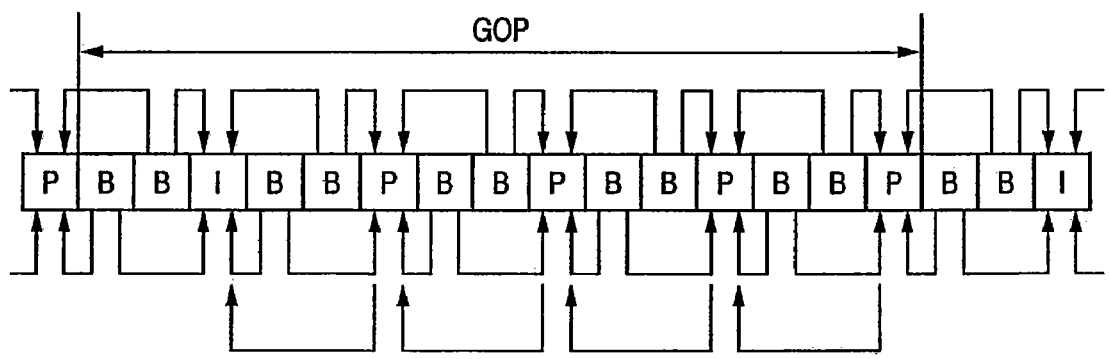
FIG. 4 is a view for explaining an MPEG moving image compression method as an example of a moving image having transition information.

FIG. 4 is a view for explaining an MPEG moving image compression method as an example of a moving image having transition information.

Frames to be encoded by MPEG coding are classified into three picture types called Intra picture (I picture), predictive picture (P picture), and bi-directional predictive picture (B picture), as shown in FIG. 4.

An I picture frame can be solely encoded/decoded by intra-frame coding without referring to information of other frames, but has a large code size. A P picture frame undergoes inter-frame predictive coding which encodes a difference obtained by making motion-compensated prediction with a previous I or P picture frame one or a plurality of frames before, and has a code size smaller than I picture. A B picture frame undergoes bi-directional inter-frame predictive coding, which predicts not only from a previous frame but also from a subsequent I or P picture frame, and has a code size still smaller than P picture.

In order to improve the coding efficiency, P and B pictures may be mostly used. However, in consideration of playback such as search or the like, edition, and recovery from an error, I pictures are inserted at appropriate intervals upon coding, as shown in, e.g., FIG. 4. A unit of a plurality of frames including I picture, as shown in FIG. 4, is called GOP (Group of Picture). Arrows shown in FIG. 4 indicate reference relationships of frames.

As P and I picture frames to be referred to upon MPEG decoding, one previous or subsequent I or P picture frame need only be present with respect to currently decoded B picture. That is, let Frame(T0) and Frame(T1) be frame images of the decoded results of the previous I or P picture and the subsequent I or P picture. Then, the following relationships are obtained.

The frame to be currently decoded is an I picture frame: Frame(T1) is discarded, and the decoded result of the current frame is set as new Frame(T1). Frame(T0) can be discarded.

The frame to be currently decoded is a P picture frame: Frame(T0) is discarded, and current Frame(T1) is set as new Frame(T0). Furthermore, the decoded result of the current frame is set as Frame(T1).

In the first embodiment, upon playback of a moving image, frame images are decoded, and a brightness component image and low-frequency brightness component image of each frame image are generated to execute color correction processing of frame images. These brightness component images are generated and discarded simultaneously with decoding (generation) and discarding of the aforementioned frame images. That is, in accordance with the moving image data coding method, a brightness component image is generated after or parallel to decoding (generation) processing of a frame image. Then, a low-frequency brightness image is generated, and the corresponding brightness component image and low-frequency brightness component image are discarded after or parallel to discarding of the frame image.

In case of moving image data, which is not encoded, a brightness component image is generated after or parallel to extraction of a frame image in accordance with the storage format of that frame image, and a low-frequency brightness component image is then generated. The corresponding brightness component image and low-frequency brightness component image are discarded after or parallel to discarding of the frame image. When moving image data is externally received via the communication unit 107, the aforementioned decoding (generation) or extraction includes request or reception of a frame image as needed.

[Update Processing]

FIG. 5 is a view for explaining the update processing of a brightness component image and low-frequency brightness component image when frame images have a reference relationship, and shows the relationship between the frame image and image data used in the color correction processing.

A reference frame image 501 is a frame image which is to be referred to by a frame image 511 to be color-corrected (to be referred to as a color correction frame image hereinafter), and is an I or P picture frame image in case of MPEG. The color correction frame image 511 is a frame image to be currently color-corrected, and is an image obtained by decoding a P or B picture frame.

A brightness component image 502 of the reference frame is obtained by extracting brightness components from the reference frame image 501. A low-frequency brightness component image 503 of the reference frame is obtained by applying low-pass filter processing to the brightness component image 502 of the reference frame. Likewise, a brightness component image 512 of the color correction frame is obtained by extracting brightness components from the color correction frame image 511. Also, a low-frequency brightness component image 513 of the color correction frame is obtained by applying low-pass filter processing to the brightness component image 512 of the color correction frame.

Assume that a given image region 532 in the color correction image 511 refers to an image region 531 in the reference frame image 501. For the sake of simplicity, assume that pixels other than the image region 532 in the color correction frame image 511 are the same as those at the same positions in the reference frame image 501, and have neither positional change nor pixel value change.

An image region 534 in the brightness component image 502 of the reference frame, and an image region 536 in the brightness component image 512 of the color correction frame correspond to the image region 532 in terms of position. Likewise, an image region 533 in the brightness component image 502 of the reference frame corresponds to the image region 531 in terms of position. Also, an image region 541 in the low-frequency brightness component image 513 of the color correction frame corresponds to the image region 536 in terms of position. Likewise, an image region 539 in the low-frequency brightness component image 503 of the reference frame corresponds to the image region 534 in terms of position.

On the other hand, an image region 540 in the low-frequency brightness component image 513 of the color correction frame is influenced by the brightness values of pixels in the image region 536 upon extraction of the low-frequency brightness components. An image region 538 in the low-frequency brightness component image 503 of the reference frame corresponds to the image region 540 in terms of position. Likewise, an image region 537 in the brightness component image 512 of the color correction frame is referred to upon extraction of low-frequency components of the image region 540. An image region 535 in the brightness component image 502 of the reference frame corresponds to the image region 537 in terms of position.

Figure 6:
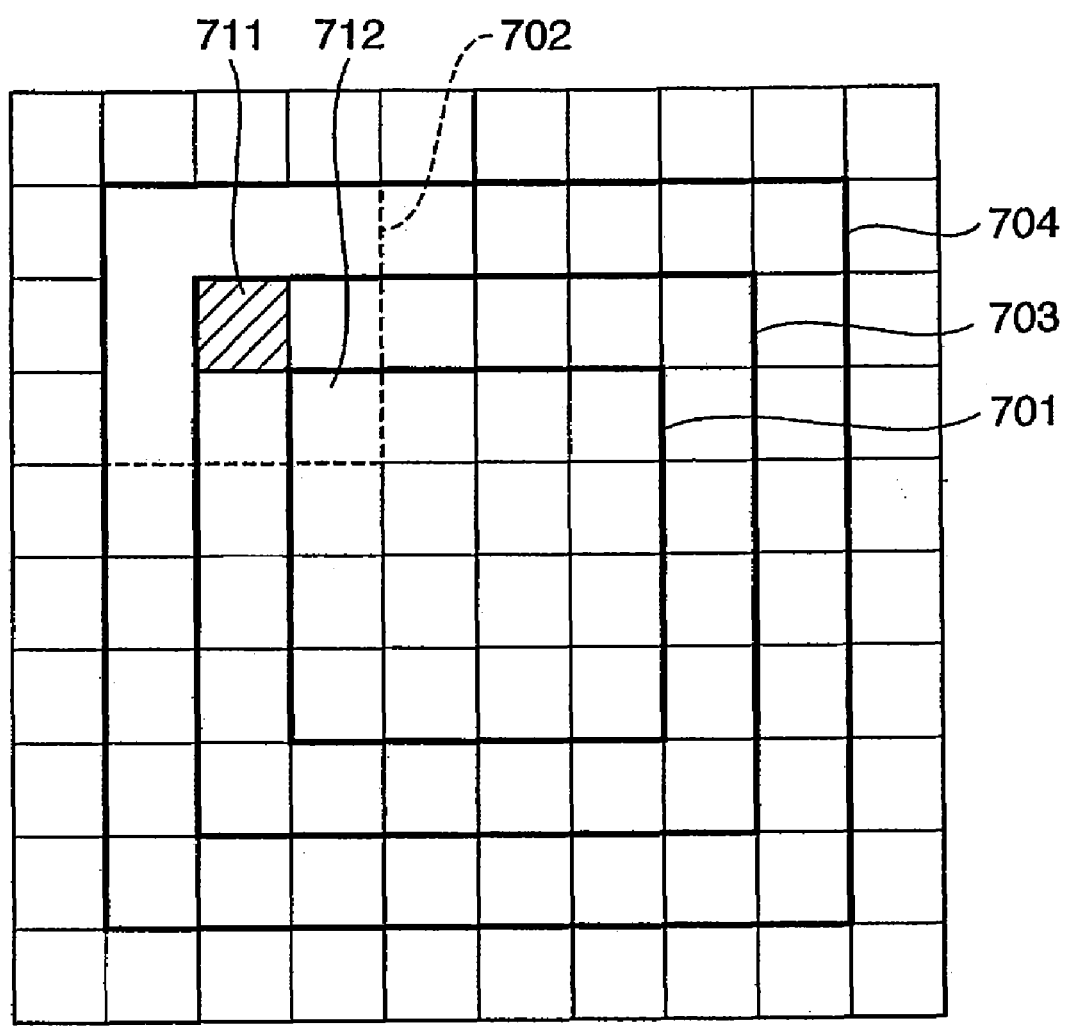
FIG. 6 is a view for explaining an image region shown in FIG. 5 in more detail.

FIG. 6 is a view for explaining the image region shown in FIG. 5 in more detail, and an array of smallest rectangles in FIG. 6 indicate pixels.

Assume that 3×3 filter processing is to be applied to an image. In this case, processing of a pixel 711 is done with reference to pixels in an image region 702. At this time, as a pixel in an image region 701, a pixel 712 is referred to. In other words, the filter processing result of the pixel 711 depends on the pixel 712. Likewise, as can be seen from the above description, around the image region 701, a region whose filter processing result depends on pixels in the image region 701 is an image region 703. In other words, when the pixel value in the image region 701 has changed, the pixel value in the image region 703 must be updated. If a filter shape is decided and that of the image region 701 is decided, the image region 703 is uniquely decided.

Furthermore, an image region 704 is referred to upon filter processing of pixels in the image region 703, and is uniquely decided when the filter shape is decided and that of the image region 703 is decided.

Note that the filter shape is not limited to a 3×3 rectangular shape, but it may be other shapes and sizes. For example, the filter shape need not always have the same vertical and horizontal sizes, and the vertical or horizontal size need not always be expressed by an odd number of pixels. Of course, the filter need not always have a rectangular shape, and may be have an arbitrary shape and size.

Referring back to FIG. 5, assume that the image region 532 refers to the image region 531. Also, assume that pixels other than the image region 532 of the color correction frame image 511 are the same as those at the same positions of the reference frame image 501 and have neither positional change nor pixel value change. In this case, as for pixels other than the image region 536 of the brightness component image 512 of the color correction frame, pixel values at the same positions in the brightness component image 502 of the reference frame are referred to (or copied). As for the image region 536, brightness components can be extracted from the image region 532.

As for pixels other than the image region 540 in the low-frequency brightness component image 513 of the color correction frame, pixel values at the same positions of the low-frequency brightness component image 503 of the reference frame are referred to (or copied). As for the image region 540, low-frequency brightness components can be extracted from the image region 537 of the brightness component image 512 of the updated color correction frame.

In the above description, the color correction frame image refers to only one frame image. However, when a plurality of frame images are referred to like a B picture frame of MPEG, the aforementioned update processing can be applied.

[Color Correction Processing of Moving Image]

The following description will be given under the assumption that an input image and an output image after color correction are specified by the sRGB color space, and brightness and tint are specified by the sYCC color space obtained by converting sRGB. Also, in the following description, one type of low-frequency component image is used in color correction.

Figure 7:
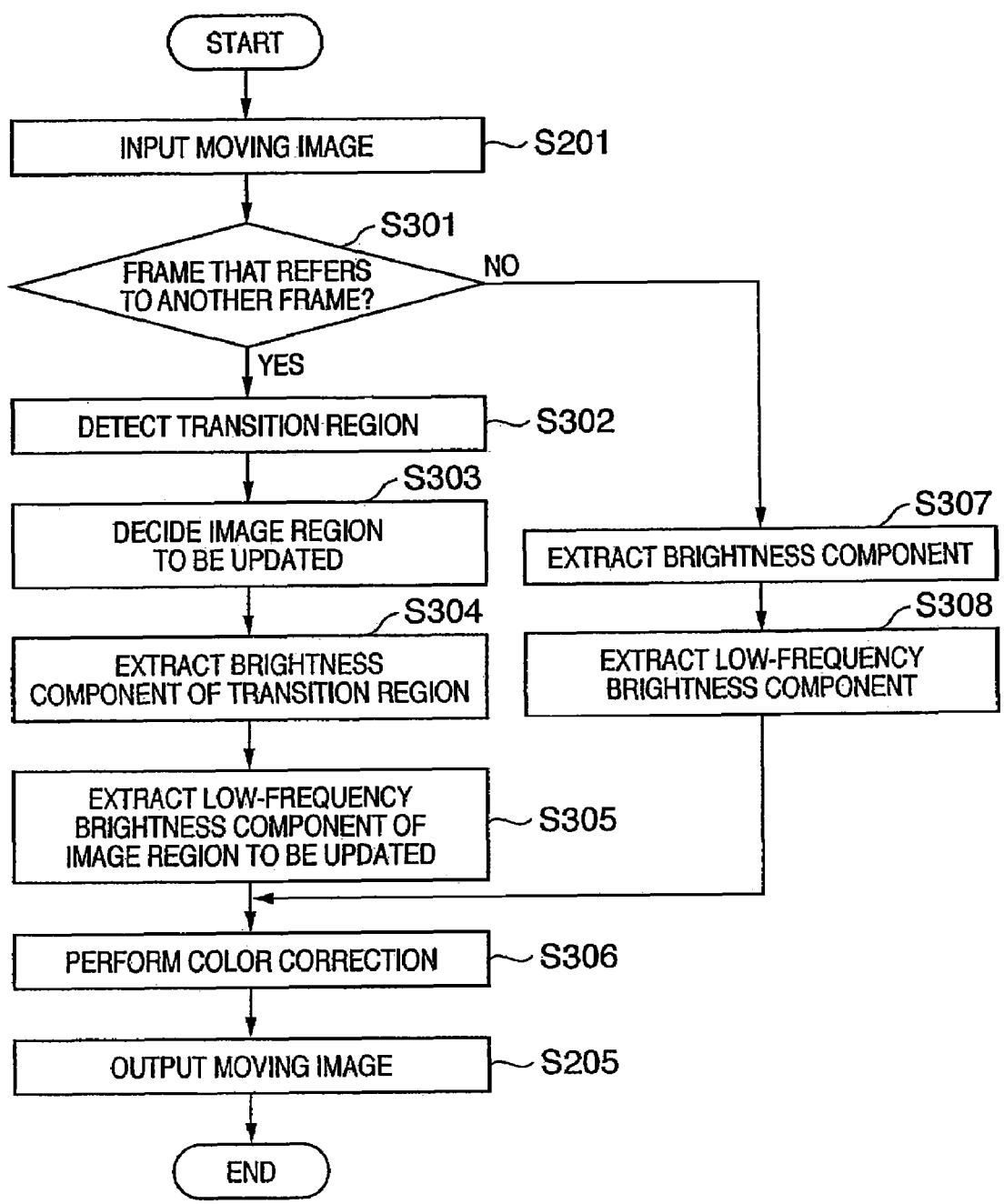
FIG. 7 is a flowchart showing details of the color correction processing of a moving image.

FIG. 7 is a flowchart showing details of the color correction processing of a moving image to be executed by the CPU 104. The same reference numerals in FIG. 7 denote the same processes as those in FIG. 2, and a detailed description thereof will often be omitted. In the following description, MPEG data is used as moving image data having inter-frame transition information.

Prior to the processing to be described below, the CPU 104 executes processing for decoding MPEG data in step S201. If there are color correction frame images (P or B picture frames) and reference frame images (I or P picture frames), the reference frame images are decoded, and are stored in the RAM 106 or data storage unit 102.

Note that generation of the brightness component image and low-frequency brightness component image of the color correction frame, and the brightness component image and low-frequency brightness component image of the reference frame will be explained below, and a description of discarding of these images will not be particularly described. These images are discarded upon discarding the corresponding frame images, as described above.

The CPU 104 determines if a color correction frame refers to another frame (S301). In case of MPEG data, the picture type of the color correction frame is checked, and if the picture type is I picture, it is determined that that frame does not refer to another frame; if the picture type is P or B picture, it is determined that that frame refers to another frame. Note that this determination processing can be implemented by examining MPEG data according to the MPEG standard.

Preferably, however, the determination results for respective frames upon the decoding processing prior to the color correction processing are stored in the RAM 106, and the determination results stored in the RAM 106 are referred to.

In case of a color correction frame which does not refer to another frame, the CPU 104 extracts brightness components from the entire color correction frame image to generate a brightness component image of the color correction frame, which is held in the RAM 106 or data storage unit 102 (S307) as in step S202. Subsequently, the CPU 104 extracts low-frequency brightness components from the brightness component image of the color correction frame to generate a low-frequency brightness component image of the color correction frame, which is held in the RAM 106 or data storage unit 102 (S308) as in step S203. The CPU 104 color-corrects the color correction frame image using the brightness component image and low-frequency brightness component image of the color correction frame (S306) as in step S204.

On the other hand, in case of a color correction frame which refers to another frame, the CPU 104 detects an image region (to be referred to as a transition region hereinafter) which includes a transition in color correction image with reference to transition information between the color correction frame image and reference frame image (S302). In case of MPEG data, the transition region can be detected with reference to motion vectors as the transition information. That is, in case of MPEG data, the color correction frame image is segmented into blocks, and motion vectors are assigned to respective blocks. Hence, by checking each motion vector, the absence of motion is determined for a block which has no transitions in position and pixel value from the corresponding block of the reference frame image; otherwise, the presence of motion is determined. Alternatively, a threshold indicating an allowable value may be set for a transition amount of the position and pixel value of the motion vector. If the transition amount is equal to or lower than the threshold, the absence of motion may be determined; otherwise, the presence of motion may be detected. Note that the motion vectors of the blocks and their transition information can be obtained by checking MPEG data in accordance with the MPEG standard. Preferably, these pieces of information may be stored in the RAM 106 for respective frames upon decoding processing, and the presence/absence of motion may be determined with reference to the information stored in the RAM 106.

Next, the CPU 104 decides an image region which must be updated (to be referred to as an update image region hereinafter) (S303). This processing decides the image region 540 to be updated of the low-frequency brightness component image 513 from the image region 541 in FIG. 5. Since the decision method of these regions has been described using FIG. 6, a detailed description thereof will be omitted. In this case, the update image region is decided for blocks having transitions detected in step S302.

The CPU 104 then extracts brightness components of the transition region (S304). In this processing, the brightness values of the image region 536 in FIG. 5 are calculated. The brightness components of the image region 536 are calculated with reference to the image region 532 of the color correction frame image 511 stored in the RAM 106 or data storage unit 102. Note that the processing in step S304 is substantially the same as that in step S202 shown in FIG. 2, except that the input is the transition region (partial image). That is, the same processing as in step S202 is executed to have the image region 532 as the input to obtain a brightness component image (partial brightness component image) of the image region 536. In this processing, an area for storing the brightness component image of the color correction frame is assured on the RAM 106 or data storage unit 102. An image region free from any transition of the brightness component image of the color correction frame, i.e., an image region other than the transition region 536 of the brightness component image 512 shown in FIG. 5 is stored by copying corresponding brightness pixel values of the brightness component image 502 of the reference frame. Also, the transition region 536 is held by recording pixel values of the brightness components generated in step S304.

The CPU 104 then extracts low-frequency brightness components of the update image region decided in step S303 (S305). In this processing, the pixel values of the low-frequency brightness components of the image region 540 in FIG. 5 are calculated. The low-frequency brightness components of the image region 540 are calculated with reference to the image region 537 of the color correction frame image 512, which is generated in step S304 and is stored in the RAM 106 or data storage unit 102. Note that the processing in step S305 is substantially the same as that in step S203 shown in FIG. 2, except that the input is a partial image of the brightness component image of the color correction frame image. That is, the same processing as in step S203 is executed to have the image region 537 as the input, thereby obtaining a low-frequency brightness component image of the image region 540. In this processing, an area for storing the low-frequency brightness component image of the color correction frame is assured on the RAM 106 or data storage unit 102. An image region which does not require any update processing of the low-frequency brightness component image of the color correction frame, i.e., an image region other than the update image region 540 of the low-frequency brightness component image 513 shown in FIG. 5, is stored by copying corresponding low-frequency brightness pixel values of the low-frequency brightness component image 503 of the reference frame. Then, the update image region 540 is held by recording the pixel values of the low-frequency brightness components generated in step S305.

That is, in step S304 the brightness components of the transition region are extracted from the color correction frame image, and are combined with those of the reference frame image, thus generating the brightness component image of the color correction frame. Then, in step S305 the low-frequency brightness components of the update image region are extracted from the brightness component image generated in step S304, and are combined with the low-frequency brightness components of the reference frame image, thus generating the low-frequency brightness component image of the color correction frame. The color correction frame image is color-corrected using the brightness component image and low-frequency brightness component image of the color correction frame generated in this manner (S306) as in step S204.

Upon performing color correction of a moving image using the brightness components and low-frequency brightness components, these components are extracted from only regions to be updated (transition region and update image region), thus reducing the processing load on color correction. Especially, when a moving image with a relatively small transition such as a moving image of a monitor camera or the like is to be color-corrected, the processing load can be effectively reduced.

Second Embodiment

Image processing according to the second embodiment of the present invention will be described below. Note that the same reference numerals in the second embodiment denote the same components as in the first embodiment, and a detailed description thereof will be omitted.

The first embodiment has exemplified the case wherein whether or not a color correction frame refers to another frame is simply determined to control the processing to branch to first processing (S307 and S308) and second processing (S302 to S305). However, when there are many inter-frame transitions, the processing load on the second processing that processes only a transition region often becomes heavier than that on the first processing that processes the entire color correction image. Hence, the second embodiment which adds another determination processing in case of a color correction frame that refers to another frame, and controls the processing to branch to the first or second processing based on the determination result will be explained.

Figure 8:
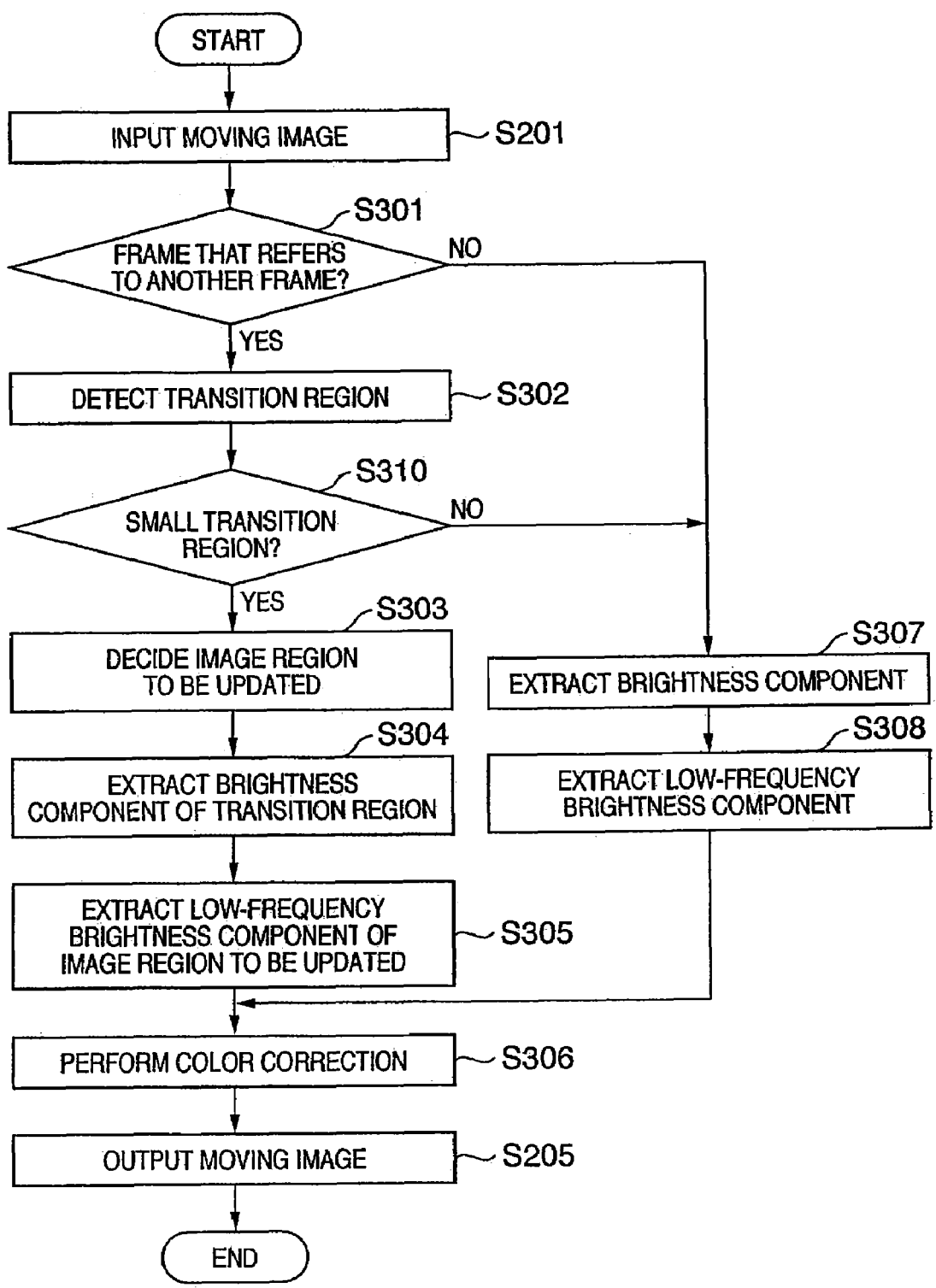
FIG. 8 is a flowchart showing the color correction processing of a moving image according to the second embodiment.

FIG. 8 is a flowchart showing the color correction processing of a moving image according to the second embodiment. The same step numbers in FIG. 8 denote the same processes as those in FIGS. 2 and 7, and a detailed description thereof will be omitted. In the following description, MPEG data is used as moving image data having inter-frame transition information.

As shown in FIG. 8, after detection of a transition region in step S302, the CPU 104 determines if the transition region is small (S310). If the transition region is small, the second processing is executed; otherwise, the first processing is executed.

In case of MPEG data, whether or not the transition region is small is determined by checking the number of blocks with transitions and comparing it with a predetermined threshold since the motion vector as the transition information is assigned to each image block having a fixed size. Alternatively, the number of pixels with transitions may be acquired, and a block in which the number of pixels with transitions is less than a predetermined value may be determined as a block having no transition.

The motion vector of each block is checked to determine whether or not its position and direction have transited or whether or not block difference information has transited even when no positional transition takes place, thus detecting a transition of that block, and counting the number of blocks from which transitions are detected. The motion vectors of the blocks and their transition information can be obtained by checking MPEG data in accordance with the MPEG standard. Preferably, these pieces of information may be stored in the RAM 106 for respective frames upon decoding processing, and the information stored in the RAM 106 may be referred to.

Note that the threshold may be empirically decided, and may be stored in the ROM 105 or data storage unit 102. Alternatively, the user can designate the threshold. In this case, prior to the processing shown in FIG. 8, a GUI such as a list box, text box, sliders, buttons, or the like may be displayed on the display unit 103, and the user may select or input the threshold by operating the input unit 101. Of course, user's threshold designation may be accepted independently from the processing shown in FIG. 8, and the user's designated value may be loaded from the RAM 106 or the like in the determination processing in step S310.

The determination processing in step S310 determines easiness upon processing a partial image, i.e., whether or not the processing load on the latter stage (S303 to S306) of the second processing is heavy. Only when it is determined that the processing load is light, the latter stage of the second processing is executed. Therefore, the present invention is not limited to the aforementioned determination method, and may adopt any other methods as long as the processing load on the latter stage of the second processing can be estimated and determined.

In this way, in addition to determination as to whether or not a color correction frame refers to another frame, whether or not the transition region is small is determined to select the first or second processing that processes the color correction frame image, thus further efficiently reducing the processing load compared to the first embodiment.

Third Embodiment

Image processing according to the third embodiment of the present invention will be described below. Note that the same reference numerals in the third embodiment denote the same components as in the first and second embodiments, and a detailed description thereof will be omitted.

Figure 9:
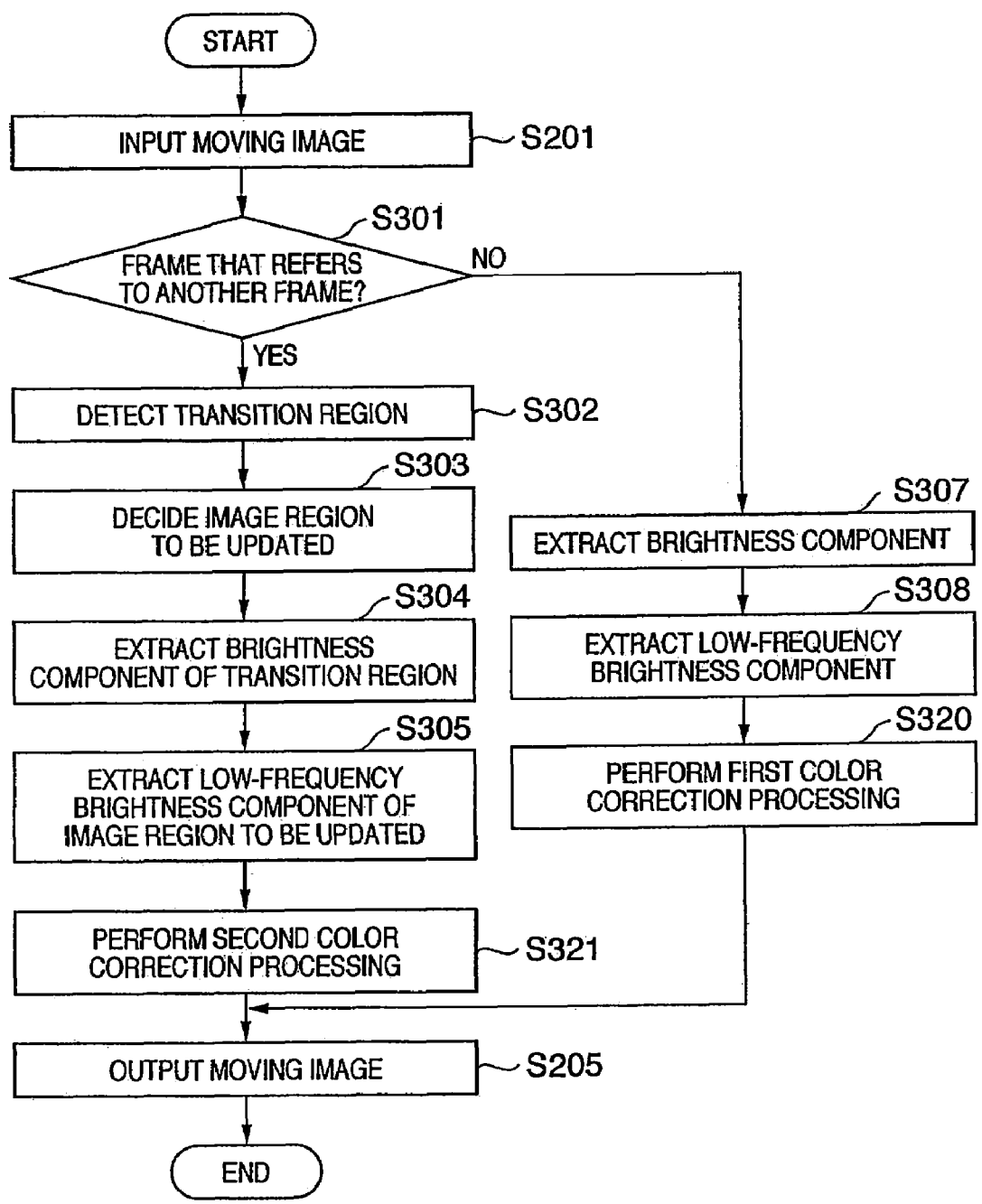
FIG. 9 is a flowchart showing the color correction processing of a moving image according to the third embodiment.

FIG. 9 is a flowchart showing the color correction processing of a moving image according to the third embodiment. The same step numbers in FIG. 9 denote the same processes as those in FIGS. 2, 7, and 8, and a detailed description thereof will be omitted. In the following description, MPEG data is used as moving image data having inter-frame transition information.

In case of a color correction frame that does not refer to another frame, the color correction frame image is color-corrected using the brightness component image and low-frequency brightness component image of the color correction frame (S320) as in step S204. This processing will be referred to as first color correction processing hereinafter.

On the other hand, color correction of a frame that refers to another frame (S321) is performed with reference to the brightness component image and low-frequency brightness component image of the reference frame, or the partial brightness component image generated in step S303 and partial low-frequency brightness component image generated in step S304. This processing will be referred to as second color correction processing hereinafter.

Figure 10:
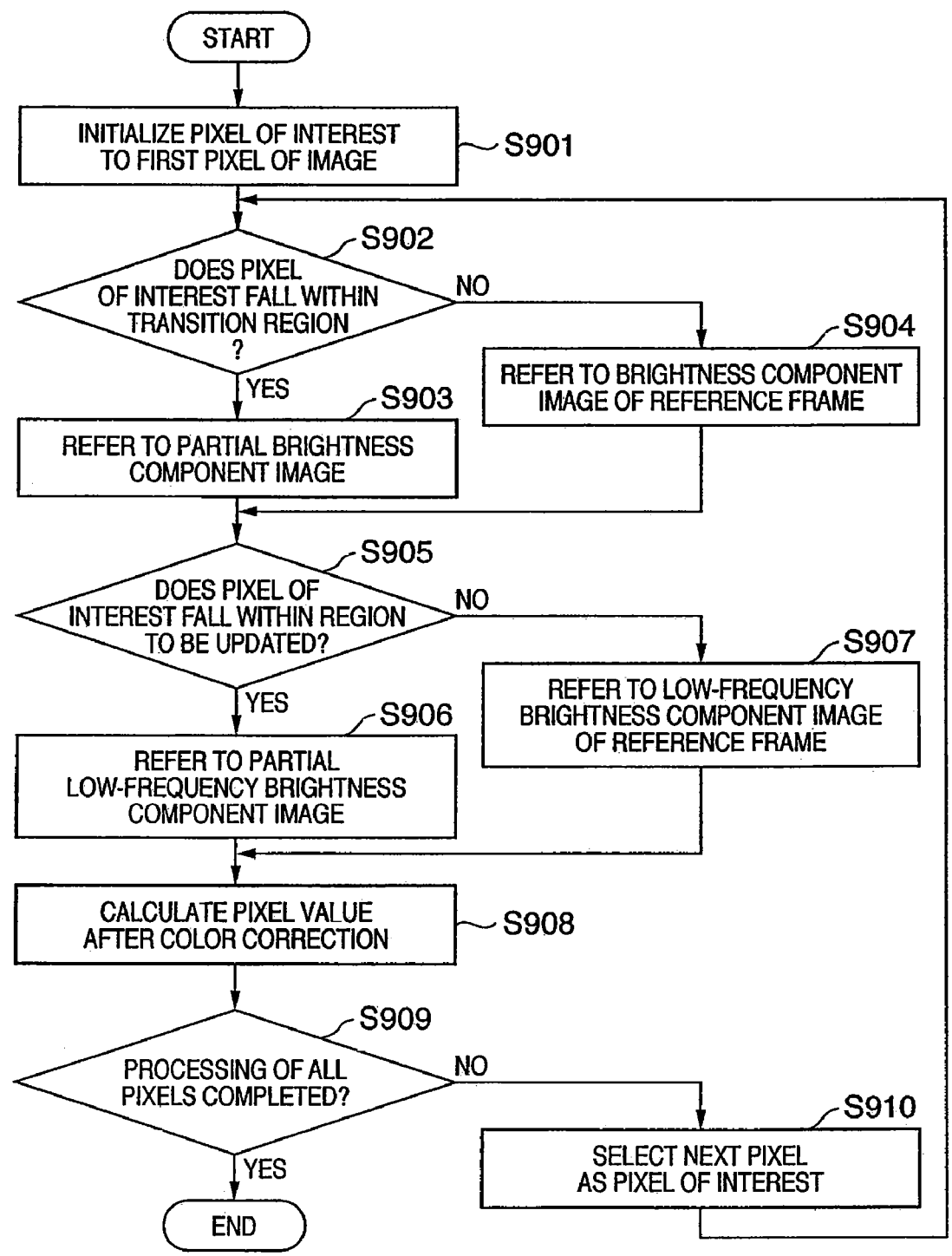
FIG. 10 is a flowchart for explaining the second color correction processing shown in FIG. 9.

FIG. 10 is a flowchart for explaining the second color correction processing.

A pixel to be color-corrected (to be referred to as a pixel of interest hereinafter) is initialized to the first pixel of an image (S901), and it is determined if the pixel of interest falls within the transition region detected in step S302 (S902). This processing corresponds to determination as to whether or not the pixel of interest falls within the image region 535 or 537 shown in FIG. 5, and can be implemented by comparing the coordinate value of the pixel of interest with that indicating the transition region detected in step S302.

If the pixel of interest falls within the transition region, the pixel value of a brightness component corresponding to the position of the pixel of interest is read out from the partial brightness component image (S903). On the other hand, if the pixel of interest falls outside the transition region, the pixel value of a brightness component corresponding to the position of the pixel of interest is read out from the brightness component image of the reference frame (S904).

It is then determined if the pixel of interest falls within the region to be updated decided in step S303 (S905). This processing corresponds to determination as to whether or not the pixel of interest falls within the image region 538 or 540 shown in FIG. 5, and can be implemented by comparing the coordinate value of the pixel of interest with that indicating the region to be updated decided in step S303.

If the pixel of interest falls within the region to be updated, the pixel value of a low-frequency brightness component corresponding to the position of the pixel of interest is read out from the partial low-frequency brightness component image (S906). On the other hand, if the pixel of interest falls outside the region to be updated, the pixel value of a low-frequency brightness component corresponding to the position of the pixel of interest is read out from the low-frequency brightness component image of the reference frame (S907).

The pixel value of the pixel of interest is color-corrected using one of formulas (4) to (6) using the pixel values of the brightness component and low-frequency brightness component (S908). It is then determined if processing of all pixels is complete (S909). If pixels to be processed still remain, the next pixel is selected as the pixel of interest (S910), and the flow returns to step S902. After that, steps S902 to S910 are repeated until processing of all pixels is completed.

In the above description, the inside/outside determination processes in steps S902 and S905 are made based on the coordinate value of the region and that of the pixel of interest. Alternatively, a region determination map 1001 shown in FIG. 11 may be generated parallel to the processes in steps S302 and S303, and determination may be made with reference to the region determination map 1001.

In the region determination map 1001 shown in FIG. 11, reference numeral 1002 denotes a region to be updated; and 1003, a transition region. For example, a value "2" is recorded in respective pixels of the transition region 1003, a value "1" is recorded in pixels of a region obtained by excluding the transition region 1003 from the region 1002 to be updated, and a value "0" is recorded in other pixels. If the pixel value of the region determination map 1001 corresponding to the position of the pixel of interest is "2", it is determined in step S902 that the pixel of interest falls within the transition region; otherwise, it is determined that the pixel of interest falls outside the transition region. Also, if the pixel value of the region determination map 1001 corresponding to the position of the pixel of interest is "0", it is determined in step S905 that the pixel of interest falls outside the region to be updated; otherwise, it is determined that the pixel of interest falls inside the region to be updated. Of course, a region map associated with the transition region and that associated with the region to be updated may be separately generated.

In this way, upon performing color correction of a moving image using the brightness components and low-frequency brightness components, these components are extracted from only regions to be updated (transition region and update image region), thus reducing the processing load on color correction.

Figure 12:
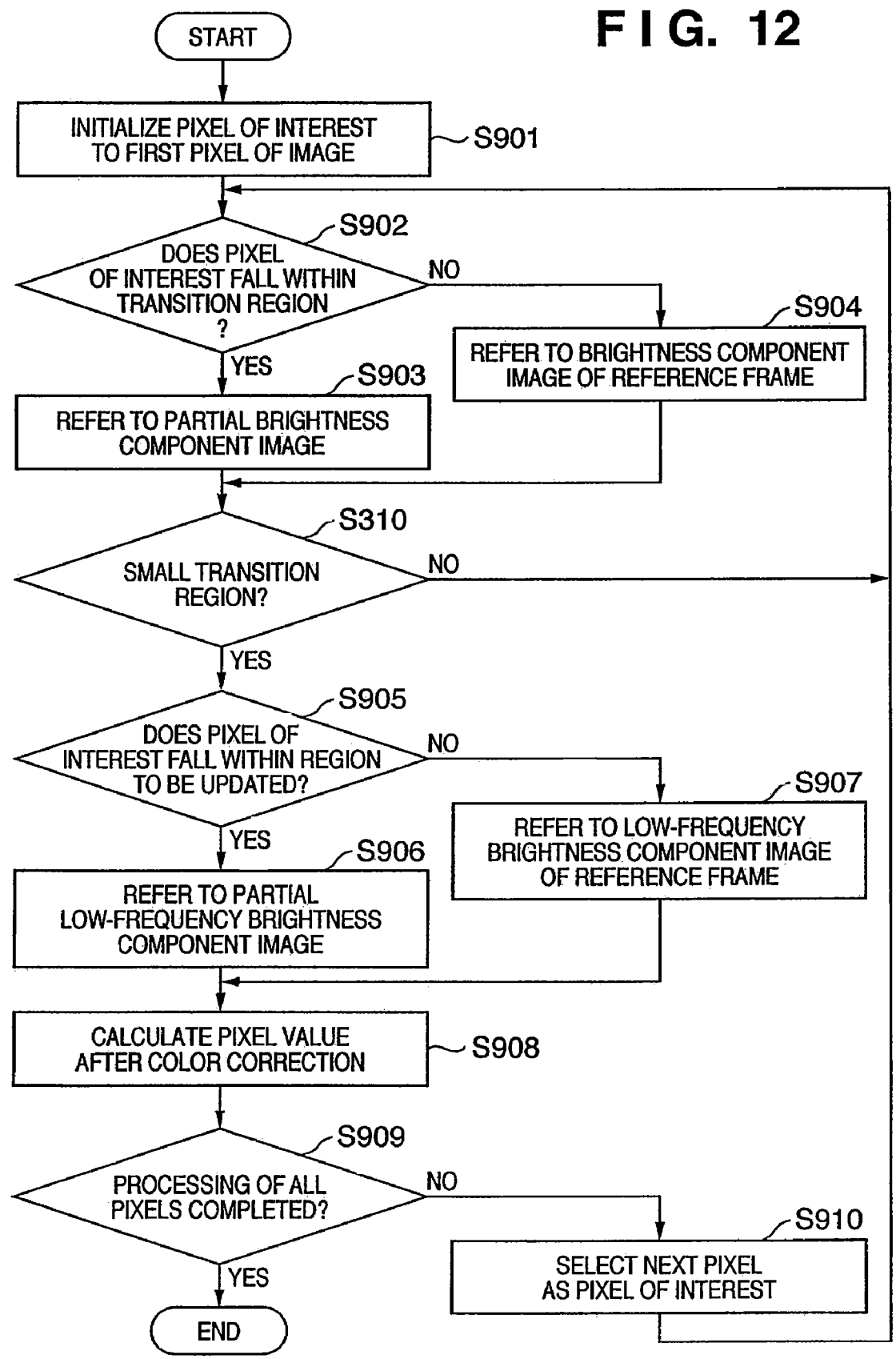
FIG. 12 is a flowchart showing a modification of the color correction processing of a moving image according to the third embodiment.

Also, as shown in FIG. 12, determination as to whether or not the transition region is small in the second embodiment (FIG. 8) may be added to the processing shown in FIG. 10 to select the first or second processing that processes the color correction frame image, thus further efficiently reducing the processing load compared to the processing shown in FIG. 10.

Fourth Embodiment

Image processing according to the fourth embodiment of the present invention will be described below. Note that the same reference numerals in the fourth embodiment denote the same components as in the first to third embodiments, and a detailed description thereof will be omitted.

Figure 13:
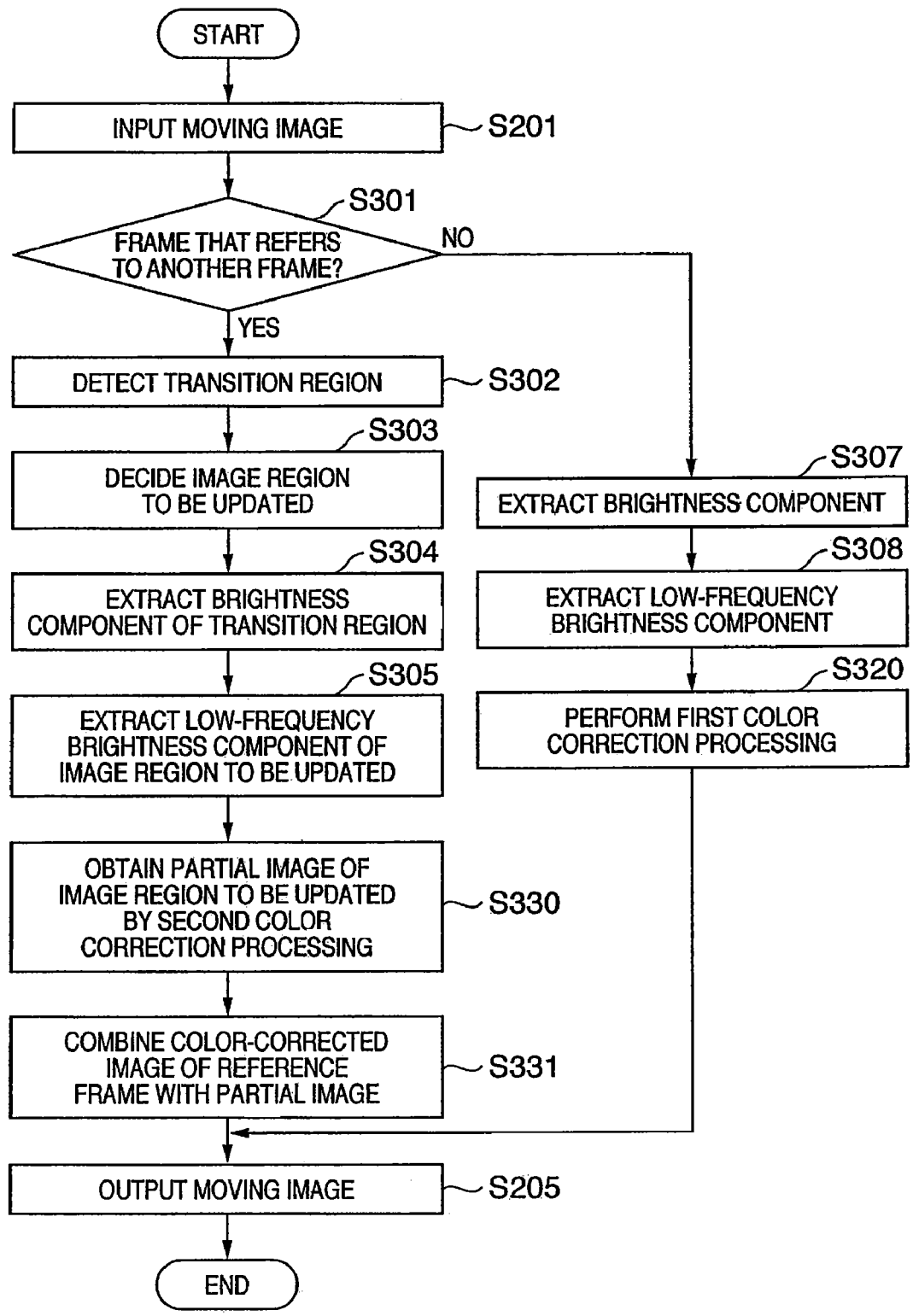
FIG. 13 is a flowchart showing the color correction processing of a moving image according to the fourth embodiment.

FIG. 13 is a flowchart showing the color correction processing of a moving image according to the fourth embodiment. The same step numbers in FIG. 13 denote the same processes as those in FIGS. 2, 7, and 9, and a detailed description thereof will be omitted. In the following description, MPEG data is used as moving image data having inter-frame transition information.

In case of a color correction frame that does not refer to another frame, the first color correction processing is applied to the color correction frame image using the brightness component image and low-frequency brightness component image of the color correction frame (S320) as in step S204.

On the other hand, a color-corrected partial image of a frame that refers to another frame is obtained as follows. The second color correction processing is applied to the region to be updated of the color correction frame image with reference to the brightness component image and low-frequency brightness component image of the reference frame, or the partial brightness component image generated in step S303 and partial low-frequency brightness component image generated in step S304. With this processing, the color-corrected partial image is obtained (S330). The color-corrected partial image and the color-corrected image of the reference frame are combined to obtain a color correction result of the color correction frame image (S331). For this purpose, an area for storing the color-corrected frame image is assured on the RAM 106 or data storage unit 102, and the color-corrected partial image of the region to be updated is overwritten on the color-corrected image of the reference frame.

In this way, upon performing color correction of a moving image using the brightness components and low-frequency brightness components, these components are extracted from only regions to be updated (transition region and update image region), thus reducing the processing load on color correction.

The fourth embodiment has exemplified the case wherein the color-corrected image of the reference frame is stored, and it is combined with the color-corrected partial image obtained by the second color correction processing. However, color correction may be performed using one of the reference frame image or color correction frame image, and the brightness component image and low-frequency brightness component image of the reference frame, and the image of this color correction result may be combined with the partial image obtained by the second color correction processing. With this processing, the color-corrected image of a frame which may be referred to need not be stored in the RAM 106 or data storage unit 102. That is, although the processing load becomes heavier than the processing of the fourth embodiment since the color correction processing is added, the color-corrected image of a frame which may be referred to need not be held, thus reducing the memory size accordingly.

Figure 14:
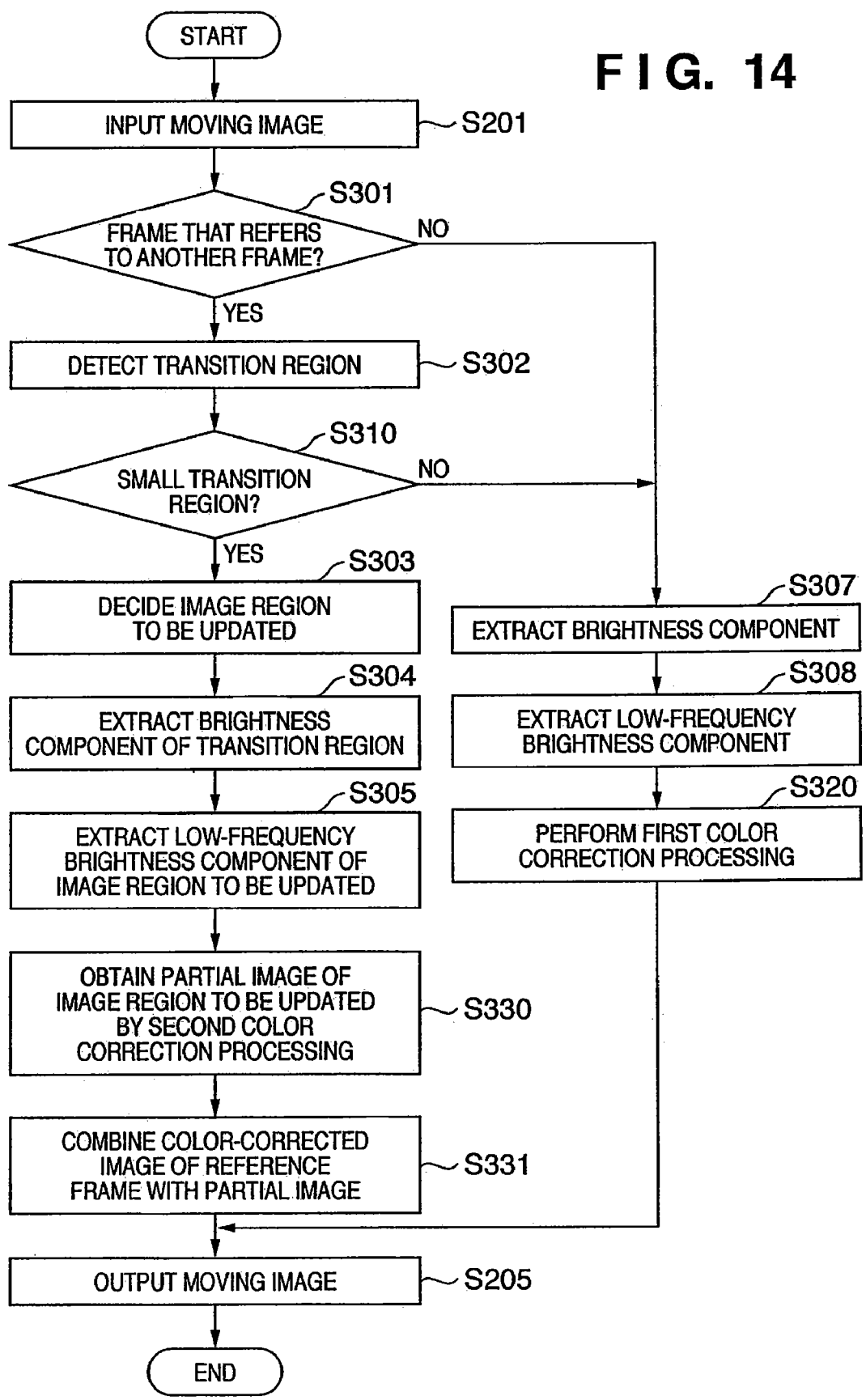
FIG. 14 is a flowchart showing the color correction processing of a moving image according to a modification of the fourth embodiment.

Also, as shown in FIG. 14, determination as to whether or not the transition region is small in the second embodiment (FIG. 8) may be added to the processing shown in FIG. 13 to select the first or second processing that processes the color correction frame image, thus further efficiently reducing the processing load compared to the processing shown in FIG. 13.

Modification of Embodiments

The embodiments described above have explained moving image data encoded by MPEG as an example of the moving image data having transition information. However, the aforementioned image processing can be easily applied to moving image data of other formats as long as they have inter-frame transition information.

In the above description, the brightness component image of the transition region is obtained by referring to the color correction frame image. Alternatively, the reference frame which is referred to by that color correction frame may be referred to. Since MPEG data has information of a rotation and difference of each block, the reference frame image is referred to after the rotation and difference are applied to a reference block of the reference frame image.

In case of a color space such as YCbCr which is obtained by linear conversion of RGB, a reference block of the brightness component image of the reference frame may be used. In this case, a transition of each block of the brightness component image can be easily predicted since the color space is obtained by linear conversion.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-020018, filed Jan. 27, 2005, which is hereby incorporated by reference herein in its entirety.

What is claimed is:

1. A method of performing color correction on a frame image of moving image data, comprising:
using a processor to perform the steps of:
detecting a transition region in a target frame image of the color correction;
setting an update region in the target frame image, where low frequency data is to be updated, in accordance with the detected transition region;
generating the low frequency data of the update region from image data of the target frame image; and
generating low frequency data of the target frame image in accordance with low frequency data of a reference frame image different from the target frame image and with the generated low frequency data of the update region, and performing the color correction on the target frame image using the generated low frequency data of the target frame image.

2. The method according to claim 1, wherein in the generating and performing step, the low frequency data, which corresponds to the whole target frame image, is generated by synthesizing the low frequency data of the reference frame image and the low frequency data of the update region, and the color collection is performed using the low frequency data corresponding to the whole target frame image.

3. The method according to claim 1, wherein the generating and performing step comprises the steps of:
determining whether an interesting pixel exists in the update region or not;
generating low frequency data of the interesting pixel using the low frequency data of the update region, and performing the color correction on the interesting pixel using the generated low frequency data, when the interesting pixel exists in the update region; and
extracting the low frequency data of the interesting pixel from the low frequency data of the reference frame image, and performing the color correction on the interesting pixel using the extracted low frequency data, when the interesting pixel does not exist in the update region.

4. The method according to claim 1, wherein the generating and performing step comprises the steps of:
determining whether an interesting pixel exists in the update region or not;
generating low frequency data of the interesting pixel using the low frequency data of the update region, and performing the color correction on the interesting pixel using the generated low frequency data, when the interesting pixel exists in the update region; and
reading out pixel data of the reference frame image, which is subjected to the color correction, as data of the interesting pixel subjected to the color correction, when the interesting pixel does not exist in the update region.

5. The method according to claim 1, wherein the moving image data is MPEG data, and the detection of the transition region uses inter frame transition information of the MPEG data.

6. An image processing apparatus for performing color correction on a frame image of moving image data, comprising:
a detector, arranged to detect a transition region in a target frame image of the color correction;
a setter, arranged to set an update region in the target frame image, where low frequency data is to be updated, in accordance with the detected transition region;
a generator, arranged to generate the low frequency data of the update region from image data of the target frame image; and
a processor, arranged to generate low frequency data of the target frame image in accordance with low frequency data of a reference frame image different from the target frame image and with the generated low frequency data of the update region, and to perform the color correction on the target frame image using the generated low frequency data of the target frame image.

7. The apparatus according to claim 6, wherein said processor generates the low frequency data, which corresponds to the whole target frame image, by synthesizing the low frequency data of the reference frame image and the low frequency data of the update region, and performs the color collection using the low frequency data corresponding to the whole target frame image.

8. The apparatus according to claim 6, wherein said processor performs the color correction by executing the steps of:
   determining whether an interesting pixel exists in the update region or not;
   generating low frequency data of the interesting pixel using the low frequency data of the update region, and performing the color correction on the interesting pixel using the generated low frequency data, when the interesting pixel exists in the update region; and
   extracting the low frequency data of the interesting pixel from the low frequency data of the reference frame image, and performing the color correction on the interesting pixel using the extracted low frequency data, when the interesting pixel does not exist in the update region.

9. The apparatus according to claim 6, wherein said processor performs the color correction by executing the steps of:
   determining an interesting pixel exists in the update region or not;
   generating low frequency data of the interesting pixel using the low frequency data of the update region, and performing the color correction on the interesting pixel using the generated low frequency data, when the interesting pixel exists in the update region; and
   reading out pixel data of the reference frame image, which is subjected to the color correction, as data of the interesting pixel subjected to the color correction, when the interesting pixel does not exist in the update region.

10. The apparatus according to claim 6, wherein the moving image data is MPEG data, and said detector detects the transition region using inter frame transition information of the MPEG data.

11. A computer-readable medium storing a computer-executable program for causing a computer to perform a method of performing color correction on a frame image of moving image data, said method comprising the steps of:
    detecting a transition region in a target frame image of the color correction; setting an update region in the target frame image, where low frequency data is to be updated, in accordance with the detected transition region;
    generating the low frequency data of the update region from image data of the target frame image; and
    generating low frequency data of the target frame image in accordance with low frequency data of a reference frame image different from the target frame image and with the generated low frequency data of the update region, and performing the color correction on the target frame image using the generated low frequency data of the target frame image.

12. The medium according to claim 11, wherein in the generating and performing step, the low frequency data, which corresponds to the whole target frame image, is generated by synthesizing the low frequency data of the reference frame image and the low frequency data of the update region, and the color collection is performed using the low frequency data corresponding to the whole target frame image.

13. The medium according to claim 11, wherein the generating and performing step comprises the steps of:
    determining whether an interesting pixel exists in the update region or not;
    generating low frequency data of the interesting pixel using the low frequency data of the update region, and performing the color correction on the interesting pixel using the generated low frequency data, when the interesting pixel exists in the update region; and
    extracting the low frequency data of the interesting pixel from the low frequency data of the reference frame image, and performing the color correction on the interesting pixel using the extracted low frequency data, when the interesting pixel does not exist in the update region.

14. The medium according to claim 11, wherein the generating and performing step comprises the steps of:
    determining an interesting pixel exists in the update region or not;
    generating low frequency data of the interesting pixel using the low frequency data of the update region, and performing the color correction on the interesting pixel using the generated low frequency data, when the interesting pixel exists in the update region; and
    reading out pixel data of the reference frame image, which is subjected to the color correction, as data of the interesting pixel subjected to the color correction, when the interesting pixel does not exist in the update region.

15. The medium according to claim 11, wherein the moving image data is MPEG data, and the detection of the transition region uses inter frame transition information of the MPEG data.

* * * * *